Sept. 10, 1935.  A. L. ROCO  2,013,899
BROACHING APPARATUS
Filed Aug. 25, 1931  3 Sheets-Sheet 2
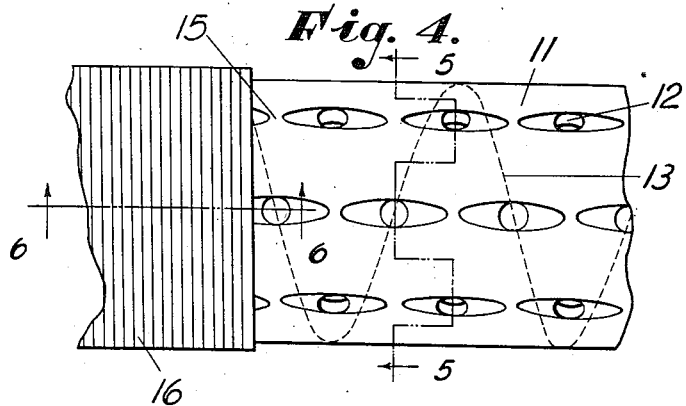
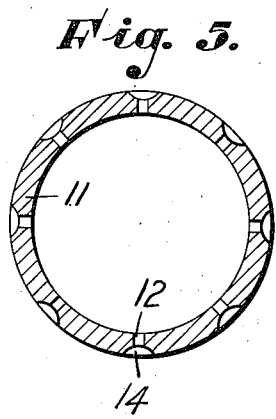
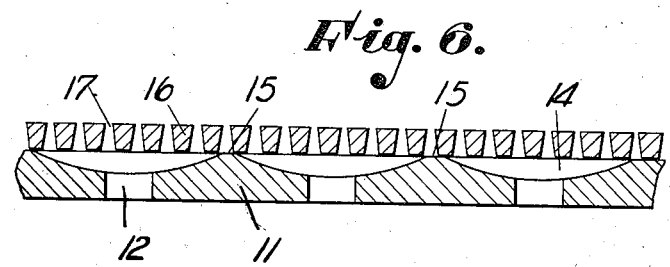
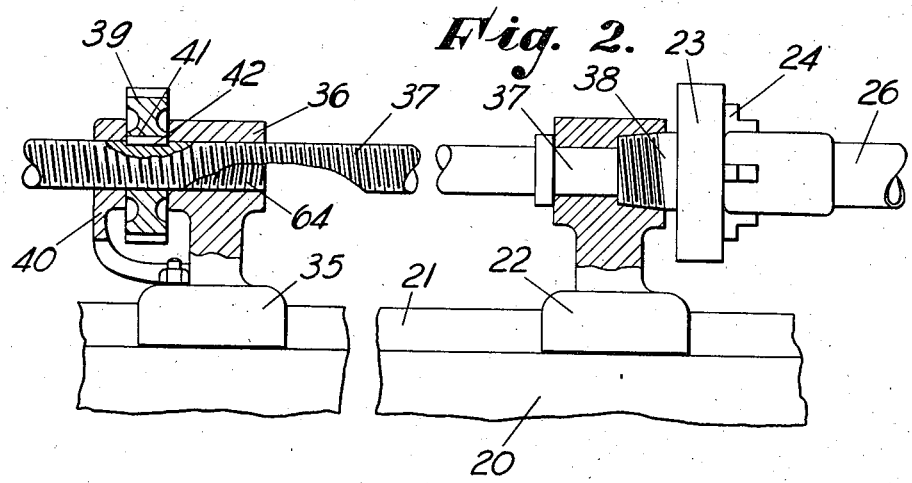
INVENTOR.
ALBERT L. ROCO.
BY Synnestvedt & Lechner
ATTORNEYS.

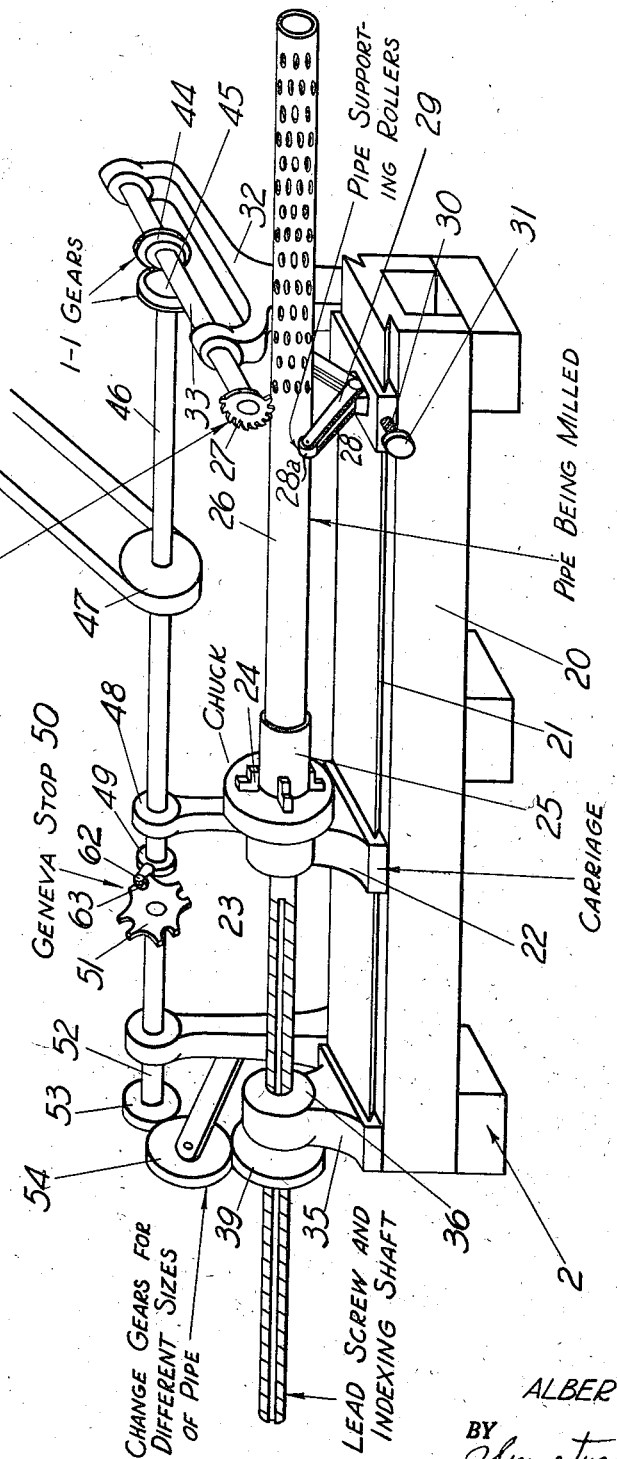

Sept. 10, 1935. A. L. ROCO 2,013,899
BROACHING APPARATUS
Filed Aug. 25, 1931 3 Sheets-Sheet 3
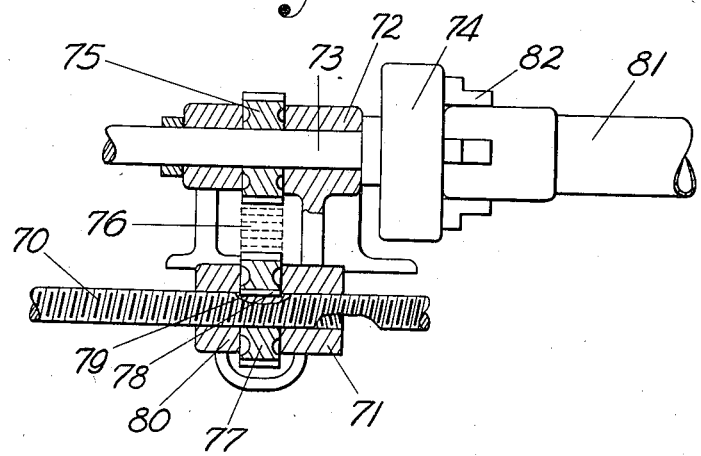
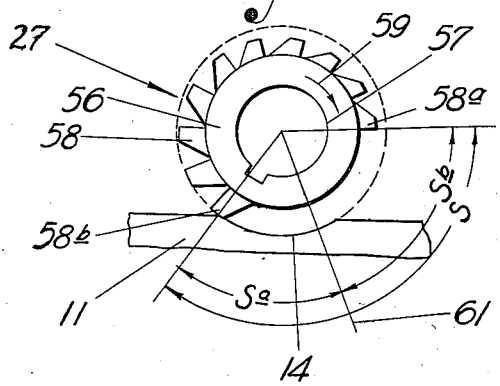 
INVENTOR.
ALBERT L. ROCO
BY
Synnestvedt & Lechner
ATTORNEYS.

Patented Sept. 10, 1935

2,013,899

UNITED STATES PATENT OFFICE 2,013,899

BROACHING APPARATUS

Albert L. Roco, Houston, Tex., assignor to Layne & Bowler Company, Houston, Tex., a corporation of Texas Application August 25, 1931, Serial No. 559,155

9 Claims. (Cl. 90—33)

This invention relates to the art of milling and particularly to the cutting of depressions or slots in a tubular member such as a pipe employed in the manufacture of well screen.

It is an object of the invention to provide an apparatus for milling such slots, depressions, or drainage channels in a screen pipe, which is simple and positive in its operation and by means of which the required positioning or alignment of such drainage channels on the tubular member or pipe may readily be had.

A further object of the invention comprehends a new type of cutter having the form of a rotary broach, this cutter being adapted to form a complete drainage channel or slot at every revolution thereof, yet providing an intermission of disengagement between the cutting elements of the cutter and the pipe during the rotation of such cutter, during which intermission the pipe may be moved relative to the cutter in regularly timed relationship. Further objects and advantages of the invention will be made evident throughout the following part of the specification.

Referring to the drawings which are for illustrative purposes only:

Fig. 1 is a simple perspective view of a machine embodying the features of the invention.

Fig. 2 is an enlarged fragmentary sectional detail at substantially the position indicated by the arrow 2 of Fig. 1, showing the feed screw and those parts associated therewith by which such feed screw is advanced and rotated.

Fig. 3 is a fragmentary sectional view showing an alternative form of feed screw construction by which the same effects as those found in the use of the feed screw construction shown in Figs. 1 and 2 may be attained.

Fig. 4 is a fragmentary elevation of a screen having a screen pipe or tubular portion with drainage channels formed therein in accordance with the present invention.

Fig. 5 is a cross-section taken substantially as indicated by the line 5—5 of Fig. 4.

Fig. 6 is a fragmentary section on a plane represented by the line 6—6 of Fig. 4, indicating the general structural characteristics of the screen.

Fig. 7 is an elevational view showing my improved type of rotary broach cutter.

Fig. 8 is a vertical cross-section through the cutter shown in Fig. 7.

For the purpose of indicating the general utility of the invention, in Figs. 4, 5 and 6 I have shown a tubular member, preferably a pipe 11, having radial holes 12 regularly spaced along center lines existing longitudinally of the pipe 11 and also being substantially centralized on a spiral line indicated at 13. In the outer surface of the pipe 11 there are formed drainage channels or depressions 14 which are centralized and in communication with the outer ends of the holes 12. These drainage channels are so spaced apart in longitudinal direction that, as shown in Figs. 4 and 6, a relatively small portion 15 of the pipe surface exists between the ends of the drainage channels 14. On the outside of the pipe 11, having such holes 12 and drainage channels 14 therein, a winding of keystone wire 16 has been placed. The separate turns of this winding of wire 16 on the pipe are spaced apart as shown at 17 in Fig. 6 so that relatively narrow slots are formed between such separate turns of wire, and owing to the fact that the wire is narrower across its lower face than across its upper face the cross-sectional area of such inlet slots as indicated at 17 diverges inwardly in the manner shown in Fig. 6. The winding of keystone wire is placed continuously over the drainage channels 14, and the inlet slots 17 formed between the turns of wire communicate at regularly spaced intervals with such drainage slots so that fluid which has entered through the inlet slots 17 may readily find entrance into the interior of the pipe 11 through a conveniently placed drainage channel 14 and its associated intercommunicating hole 12.

In the old practice of manufacturing wire wound screen of the general character described above, the wire has been wound on a pipe having straight holes drilled therethrough, and owing to the fact that these holes must be spaced a distance apart in order to preserve a required measure of strength in the pipe on which the wire is wound, only a limited portion of the screen slots formed between the separate turns of the wire were effective for drainage purposes. The new type of wire-wound screen having drainage channels 14 in conjunction with the intercommunicating holes 12 makes substantially the entire system of inlet slots 17 effective for drainage purposes, due to the fact that no matter where a fluid enters a slot 17 it will be required to travel laterally within such slots only a relatively short distance to encounter a drainage channel 14 through which it may pass into a hole 12.

Although my new milling machine is adapted for operation on other products, it has its principal utility in the preparation of the pipe 11 for use as a supporting core on which to wind the wire 16 so as to form a screen member. In Fig. 1

I show a supporting structure 20 in the form of a longitudinal bed. Slidable upon the ways 21 of this bed 20 is a head 22 which carries a pipe engaging or holding member 23 which conveniently may have the form of a chuck provided with jaws 24 for engaging the collar 25 of a length of pipe 26 which is to be subjected to the milling operation. Near the rightward end of the supporting structure 20 an auxiliary pipe supporting means 28 is placed, including pipe engaging rollers 28a, supported by swingable arms 29 which may be operated between open and closed positions relative to the pipe by means of a screw 30 equipped with an operating handle 31. In this manner the pipe or work will be supported relative to the cutter in a fixed position and articles of different size may be properly positioned by adjustment of the work supports. By suitable structure such as indicated at 32 a shaft 33 is positioned in such proximity to the pipe 26 that a milling cutter 27 will be held in proper operating position relative to the pipe 26 and need not be adjustable because of the particular construction of the cutter.

At the leftward end of the supporting structure 20 is a standard 35 having a nut 36 at its upper end, this nut 36 being shown in section in Fig. 2. Through the nut 36 is threaded a screw 37, the lead of which corresponds to the lead of the spiral 13 indicated in Fig. 4. The screw 37, as shown in Fig. 2, is operatively connected with the hub portion 38 of the holding means 23 supported by the traveling head 22. Adjacent to the nut 36 is a gear 39 which is retained by a member 40 and is equipped with a key 41 engaging a longitudinal keyway 42 in the screw 37.

A bevel gear 44 mounted on the cutter shaft 33 meshes with a bevel gear 45 which is carried on a secondary shaft 46 which may be equipped with a gear or pulley 47 and which extends rearwardly to the leftward end of the supporting structure 20 where it is supported by a bearing structure 48. Mounted on the leftward or rearward end of the shaft 46 is the driving element 49 of a Geneva stop mechanism 50 having a six point, or otherwise, forked wheel 51 mounted on a shaft 52 which carries a gear 53 whereby the intermittent rotation of the forked wheel 51 of the Geneva stop 50 may be imparted through an intermediate change gear 54 to the gear 39 mounted on the screw 37.

In Fig. 7 I have indicated a new form of spiral or broach milling cutter which I prefer to employ in the practice of the invention. This cutter consists of a rotatable body 56 having a bore 57 whereby it may be placed upon the cutting shaft 33 and having cutting members or elements 58. It will be noticed that the cutting elements 58 do not extend entirely around the full circumference of the cutter body 56 but that there is an angular space S existing between the shortest cutter 58a and the longest cutter element 58b. The cutter elements 58 are regularly increased in length from the short cutting element 58a to the long cutting element 58b, thus causing the outer cutting ends of these cutting elements 58 to substantially follow a spiral path from the point or position of 58a to the point or position of 58b. With this cutter 27 it is possible to cut a channel 14 in the wall of a pipe 11 by rotating the cutter through less than a single revolution for the reason that when the cutter is rotatably set with its center at such distance from the surface of the pipe 11 that the shorter cutting element 58a will engage or cut into such surface of the pipe 11, a rotation of the cutter 27 in the direction of the arrow 59 will cause each successive cutter element 58 to traverse the adjacent portion or surface of the pipe wall and to remove a proportionate amount of metal therefrom owing to the fact that each cutting element extends radially a proportionate distance beyond the preceding cutter element.

The cutter 27 is so constructed that there is a circumferential space existing between the cutter element 58b and the cutter element 58a, such circumferential space corresponding to the angular space S. In Fig. 7, I have shown the cutter 27 as having just completed a cut, the cutter element 58b being shown in the position which it assumes in completing the cutting of a channel or depression 14 in the wall of the pipe 11. In the design of the cutter 27 the angular space S is of such size that there will be an interim of sufficient time to permit the advancing mechanism indicated by the Geneva stop 50 to cause a relative movement between the pipe 11 and the cutter 27, so that the pipe will be in position for a new cut by the time the cutter element 58a reaches the position of the radial line 61, where it will make engagement with the new point in the surface of the pipe 26 at which another channel 14 is to be cut. In this manner a periodic cutting is performed by the cutter and between periods the work is moved.

From the foregoing description it will be seen that the arc S or the corresponding circumferential space between the cutter element 58b and the cutter element 58a must include the angular space Sa and the angular space Sb, the angular space Sa indicating the angular distance between the point on the surface of the pipe at which the cutter element 58a will make engagement with a new point in the surface of the pipe 26, and the angular space Sb being proportionate to the time required for the operation or actuation of the advancing mechanism.

In the operation of the milling machine, the pipe 26 is placed with one end thereof gripped in the jaws 24 of the holding means 23 and with its rightward end supported by the rollers 28 in a position under the cutter 27. Power may then be applied to the shaft 46 through the gear or pulley 47 causing shaft 46 to rotate, with the result that the cutter shaft 33 is rotated in proper operating position, thus causing the teeth 58 of the rotary broach cutter to accomplish a cutting operation such as described with reference to Fig. 7. With the shaft 46 in continuous rotation, the cutting operation is completed, and at the completion of the cutting operation the advancing dog or pin 62 of the Geneva stop mechanism 50 will make engagement with a cooperating radial slot 63, with the result that during the rotation of the cutter 27 in non-engagement with the pipe 26, the Geneva stop mechanism will be rotated a single point, this rotation being transferred through the shaft 52, gear 53, change gear 54, to the gear 39, which, as shown clearly in Fig. 2, is mounted on the screw 37 and keyed thereto so that the intermittent rotation which it has received from the Geneva stop mechanism will be imparted to the screw 37, causing this screw to rotate through a part of a revolution and at the same time to travel longitudinally owing to the engagement of the screw with the thread 64 in the stationary nut 36. The gear 39 is longitudinally slidable on the screw 37, the only positive engagement it makes therewith being through the key 41 which engages the keyway 42 of the screw.

From the foregoing, it will be recognized that the parti-revolution of the screw 37 produces a spiral forward movement of the screw 37, which movement is transmitted to the holding means 23 and thereby to the work, having form of the pipe 26, which is engaged by the jaws 24 of such holding means. Through the use of the mechanism in the manner described, the pipe 26 is caused to advance spirally in a forward direction and in an intermittent manner; or in other words, the pipe moves forwardly and rotates so that the spiral path 13 indicated in Fig. 4 is at all times centralized under the cutter 27 and the spiral is of such lead that all spaces as indicated at 15 in Figs. 4 and 6 will be left between the ends of the drainage channel 14. For pipe of various sizes the change gears 53 and 54 may be replaced by the proper gears to give the required number of parti-rotation or advances corresponding to the number of rows of drainage channels 14 desired to be cut in the pipe, so as to preserve in the various sizes of pipe a substantially constant circumferential dimension between the longitudinal rows of drainage channels 14.

In Figs. 1 and 2 of the drawings, I have shown the pipe advancing mechanism in the form of a screw attached directly to the pipe engaging means having the form of a chuck 23. In Fig. 3, I show an alternative form of pipe advancing and rotating mechanism in which I employ a screw 70 which may be rotated but which is held against longitudinal movement. This screw engages a nut 71 which is secured to a movable head 72, this head carrying a shaft or spindle 73 on the forward end of which a chuck 74 is mounted. It will be recognized that by rotating the screw 70, its engagement with the nut 71 will cause the carriage 72 to move longitudinally. In order to rotate the chuck 74 as it advances due to the action of the screw 70, I secure a sprocket 75 on the spindle 73, which is driven through a silent chain belt 76 from a gear or sprocket 77 surrounding the screw 70, but having no other engagement therewith than that provided by a key 78 which engages a longitudinal keyway 79 in the screw 70. A retainer 80 holds the gear 77 in its operative position adjacent to the nut member 71.

When the screw 70 is intermittently rotated, the engagement of the nut member 71 therewith will cause a movement of the head 72 parallel to the axis of the screw 70 and the spindle 73 carried in the head 72 will, at the same time, be rotated through and by reason of the rotation of the gear 77, which rotation is transmitted through the chain belt member 76 to the gear or sprocket 75 mounted on the spindle 73. In the foregoing manner I am able to accomplish a forward motion of a pipe 81 held in the jaws 82 of the chuck 74, with the result that a cutter placed for operation on the pipe 81 will traverse a spiral path relative to the outer cylindrical surface of the pipe 81, this desired movement being accomplished in this form of the invention without a longitudinal movement of the screw 70, as is necessary in the embodiment of the invention shown in Figs. 1 and 2.

The foregoing, however, is merely a matter of structural details, concerning simple means in which the invention may be embodied, it being recognized that there are various other mechanical forms in which the principals of the invention may also be embodied.

It is desired to call attention to the fact that the invention herein disclosed could be equally well used to cut slots clear through the pipe 11 instead of only partially therethrough as is done when making the grooves or depressions 14.

I claim:—

1. A machine of the character described, including: means for supporting a pipe; a screw having operative connection with said pipe to rotate and longitudinally move said pipe; a stationary nut engaging said screw; a cutter supported in operative position relative to said pipe, adapted for intermittent cutting engagement therewith; and a Geneva stop mechanism for intermittently rotating said screw, said Geneva stop mechanism being timed relative to said cutter whereby to accomplish a periodic movement of said pipe during the inoperative period of said cutter.

2. A machine of the character described, including: a supporting structure; holding means movably supported on said supporting structure; a screw having operative connection with said holding means; a cutter shaft approximate to work held in said holding means; a cutter mounted on said shaft; a secondary shaft rotating in timed relationship with said cutter shaft; a stationary nut engaging said screw; and means operated by said secondary shaft adapted to intermittently rotate said screw whereby to intermittently rotate and advance said holding means.

3. A machine of the character described, including: a supporting structure; work holding means movably supported on said supporting structure; a screw having operative connection with said work holding means; a stationary nut engaging said screw; a cutter shaft approximate to work held in said holding means; a cutter on said cutter shaft adapted for intermittent engagement with said work; a secondary shaft rotating in timed relationship with said cutter shaft; and a Geneva stop mechanism operated by said secondary shaft and being adapted to intermittently rotate said screw whereby to rotate and advance said work holding means.

4. A machine of the character described, including: pipe supporting means; a cutter shaft, a cutter thereon for operation on said pipe; a stationary structure holding said cutter shaft rotatably in operative position relative to said pipe; and means for intermittently rotating and advancing said pipe longitudinally during the period of non-engagement of said cutter with said pipe.

5. A machine of the character described, including: a supporting structure; a head longitudinally movable on said supporting structure; a pipe engaging member rotatably secured in said head; a cutter adapted for operation on a pipe engaged by said engaging means; a screw for longitudinally advancing said head, there being operative connection between said screw and said engaging means for accomplishing rotation of said engaging means; and means to continuously rotate said cutter and for intermittently rotating said screw during the periods of disengagement of said cutter with said pipe.

6. A machine of the character described, including: means for supporting a pipe; a screw having operative connection with said pipe whereby to rotate and longitudinally move said pipe; mechanism for intermittently rotating said screw whereby to produce a longitudinal and rotary movement of said pipe; said pipe and cutter being spaced a fixed distance apart, and a cutter supported in operative position relative to said pipe, such cutter being adapted for intermittent cutting engagement with said pipe.

7. A machine of the character described, including: a supporting structure; means on said supporting structure for holding a pipe; a cutter supported in operative position relative to said pipe; means for producing an intermittent cutting engagement between said cutter and said pipe; and means for producing a relative movement between said pipe and said cutter whereby to bring successive points of said pipe into operative position relative to said cutter, said means including a Geneva stop mechanism timed for operation intermediate the periods of cutting engagement between said cutter and said pipe.

8. A machine of the character described including means for supporting a pipe, a periodic cutter supported in fixed rotatably operative position relative to said pipe, means to drive said cutter at a constant rate for intermittent cutting engagement with the pipe, a screw having operative connection to said pipe in a manner to rotate and longitudinally move said pipe, a stationary nut engaging said screw, and means having its operation timed relative to the cutter for intermittently rotating said screw to move the pipe during the non-cutting period of said cutter.

9. A machine of the character described including, a supporting structure, pipe holding means on said supporting structure, a cutter supported for engagement with a pipe positioned on said pipe supporting means, means to drive said cutter, means on said cutter for intermittent cutting engagement with said pipe, means to space said pipe and cutter a fixed distance apart, and means operative in timed engagement with said cutter so as to intermittently move said pipe in a manner to bring a predetermined portion of said pipe into a position of operation relative to said cutter.

ALBERT L. ROCO.